(12) United States Patent
Sharma et al.

(10) Patent No.: US 11,947,037 B2
(45) Date of Patent: Apr. 2, 2024

(54) APPARATUS AND METHOD FOR OBJECT MOTION ANALYSES OF LIDAR SENSOR DATA

(71) Applicant: Quanergy Solutions, Inc., San Jose, CA (US)

(72) Inventors: Akshaya Sharma, Sunnyvale, CA (US); Tianyue Yu, Sunnyvale, CA (US); Ross C Taylor, Sunnyvale, CA (US)

(73) Assignee: Quanergy Solutions, Inc., San Jose, CA (US)

( * ) Notice: Subject to any disclaimer, the term of this patent is extended or adjusted under 35 U.S.C. 154(b) by 743 days.

(21) Appl. No.: 17/062,419

(22) Filed: Oct. 2, 2020

(65) Prior Publication Data

US 2021/0103033 A1 Apr. 8, 2021

Related U.S. Application Data

(60) Provisional application No. 62/909,335, filed on Oct. 2, 2019.

(51) Int. Cl.
*G01S 7/48* (2006.01)
*G01S 17/42* (2006.01)
*G01S 17/50* (2006.01)
*G01S 17/86* (2020.01)

(52) U.S. Cl.
CPC ............ *G01S 7/4808* (2013.01); *G01S 17/42* (2013.01); *G01S 17/50* (2013.01); *G01S 17/86* (2020.01)

(58) Field of Classification Search
CPC ........ G01S 7/4808; G01S 17/86; G01S 17/42; G01S 17/50; G01S 17/89; G01S 7/4802; G91S 17/87
USPC ...................................................... 356/4.01
See application file for complete search history.

(56) References Cited

U.S. PATENT DOCUMENTS

| | | | |
|---|---|---|---|
| 9,360,554 B2 | 6/2016 | Retterath et al. | |
| 9,767,365 B2 | 9/2017 | Robinson et al. | |
| 9,911,340 B2 | 3/2018 | Samarasekera et al. | |
| 10,163,256 B2 | 12/2018 | Benedek et al. | |
| 2016/0162742 A1 | 6/2016 | Rogan | |
| 2019/0227175 A1 | 7/2019 | Steinberg | |

OTHER PUBLICATIONS

International Search Report and Written Opinion dated Jan. 5, 2021, for PCT Application No. PCT/US2020/054129, filed on Oct. 2, 2020, 8 pages.

*Primary Examiner* — Daniel L Murphy
(74) *Attorney, Agent, or Firm* — Fox Rothschild LLP; Carol E. Thorstad-Forsyth (57) ABSTRACT

A system has a collection of lidar sensors to generate lidar point cloud data for a defined geolocation. A computer is connected to the collection of lidar sensors via a network. The computer includes a processor and a memory storing instructions executed by the processor to process the lidar point cloud data to produce an object list for each moving object identified in the lidar point cloud data. The object list includes object classification information, object motion information, object position data, and object size data. Object motion analyses are performed on each object list to generate object motion analytics for the defined geolocation.

20 Claims, 6 Drawing Sheets

APPARATUS AND METHOD FOR OBJECT MOTION ANALYSES OF LIDAR SENSOR DATA

CROSS-REFERENCE TO RELATED APPLICATION

This application claims priority to U.S. Provisional Patent Application Ser. No. 62/909,335, filed Oct. 2, 2019, the contents of which are incorporated herein by reference.

FIELD OF THE INVENTION

This invention relates generally to processing lidar sensor data. More particularly, this invention is directed toward object motion analyses of lidar sensor data.

BACKGROUND OF THE INVENTION

Light detection and ranging (Lidar) is a method for measuring distances by illuminating a target with laser light and measuring the reflection with a sensor. Differences in laser return times and wavelengths can then be used to make three-dimensional representations of the target. Techniques for analyzing a static target are well developed. However, there is a need for improved techniques for analyzing a dynamic target with objects in motion.

SUMMARY OF THE INVENTION

A system has a collection of lidar sensors to generate lidar point cloud data for a defined geolocation. A computer is connected to the collection of lidar sensors via a network. The computer includes a processor and a memory storing instructions executed by the processor to process the lidar point cloud data to produce an object list for each moving object identified in the lidar point cloud data. The object list includes object classification information, object motion information, object position data, and object size data. Object motion analyses are performed on each object list to generate object motion analytics for the defined geolocation.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
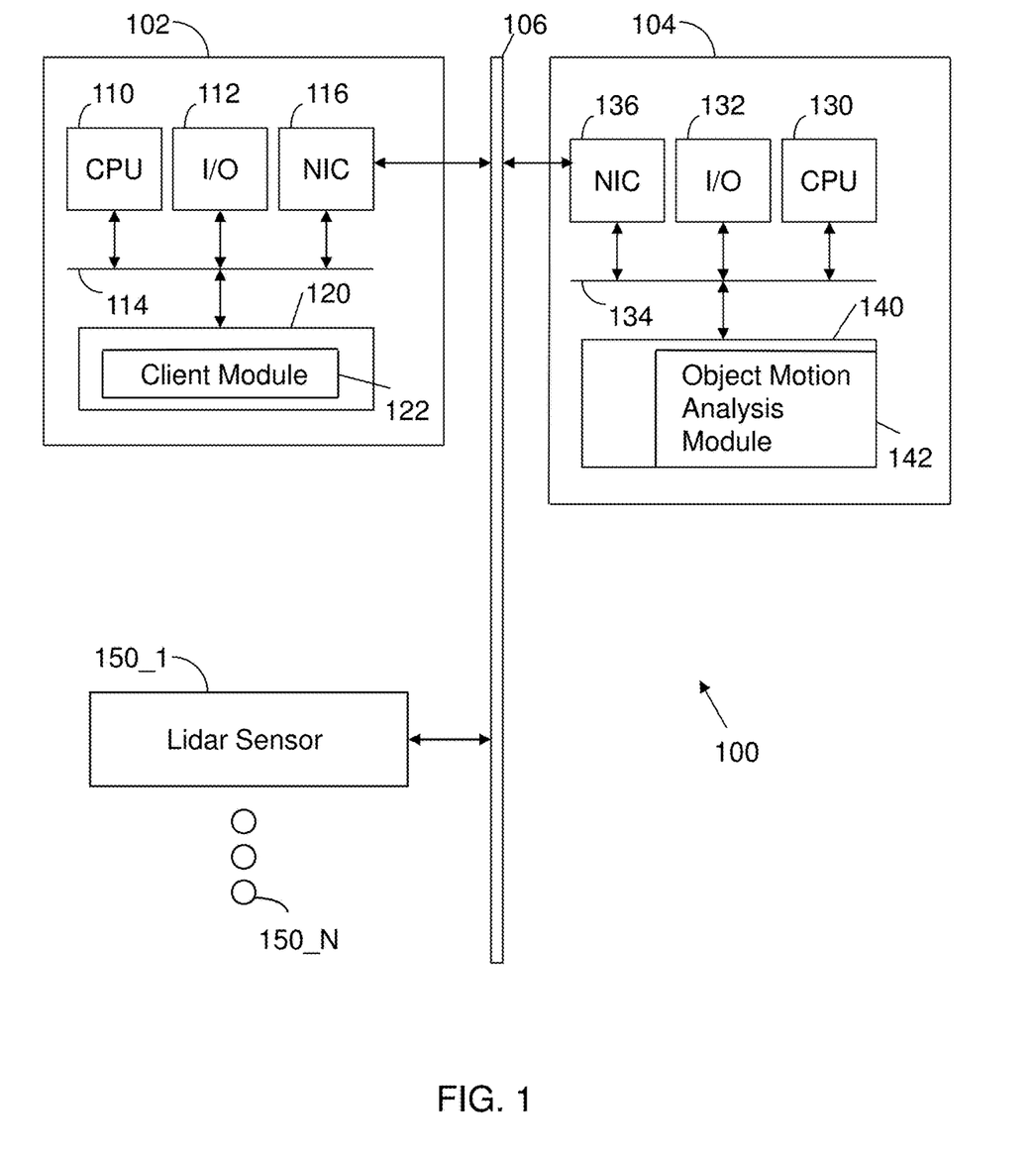
FIG. 1 illustrates a system configured in accordance with an embodiment of the invention.

FIG. 1 illustrates a system 100 configured in accordance with an embodiment of the invention. The system 100 includes a client machine 102 in communication with a server 104 via a network 106, which may be any combination of wired and wireless networks. The client machine 102 includes a processor (e.g., central processing unit 110) in communication with input/output devices 112 via a bus 114. The input/output devices 112 may include a keyboard, mouse, touch display and the like. A network interface circuit 116 is also connected to the bus 114 to provide connectivity to network 106. A memory 120 is also connected to bus 114. The memory 120 stores a client module 122 with instructions executed by processor 110 to implement client-side functions, such as retrieving object motion analytics from server 104. Client machine 102 may be a computer, tablet, smart phone and the like used by a user for surveilling of object motion data in a physical location of interest.

Server 104 includes a processor 130, input/output devices 132, a bus and a network interface circuit 136. A memory 140 is connected to bus 134. The memory 140 stores an object motion analysis module 142 with instructions executed by processor 130 to implement operations disclosed herein.

Also connected to the network 106 is a collection of lidar sensors 150_1 through 150_N. The lidar sensors 150_1 through 150_N are installed in a geo-location of interest. By way of example, the lidar sensors 150_1 through 150_N may be installed at a height of between 2 to 5 meters in a corridor with each lidar sensor positioned approximately 15 meters from one another. Each lidar sensor is typically attached to a wall, a ceiling or a standalone mount with a target viewing area pointed downward. Lidar sensor data is conveyed to server 104 via network 106.

Figure 2:
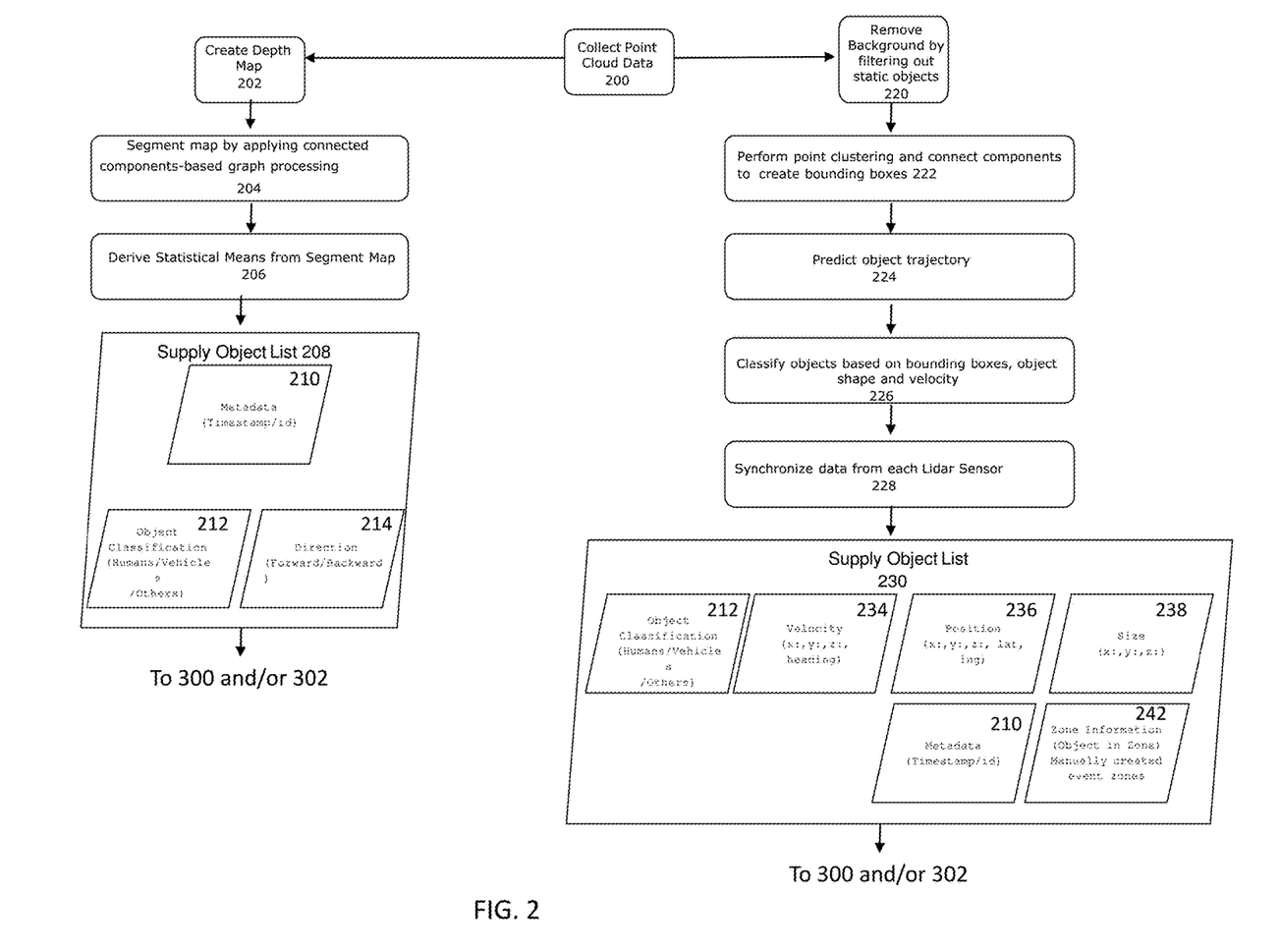
FIG. 2 illustrates lidar sensor data processing performed in accordance with an embodiment of the invention.

FIG. 2 illustrates processing operations performed by the object motion analysis module 142. Initially, point cloud data is collected 200. That is, lidar sensor data from lidar sensors 150_1 through 150_N is received from network 106 at the object motion analysis module 142. The point cloud data is a continuous stream of data that provides information on each point the lasers hit.

The objection motion analysis module 142 creates a depth map 202. That is, the object motion analysis module 142 color codes each point based on its distance or height.

The resultant map is then segmented by applying connected components-based graph processing 204. That is, segmentation on the depth map is performed to detect the number of objects seen. In one embodiment, connected components-based graph processing is used to accommodate cases like tailgating and side by side walking.

Statistical measures are derived from the segment map 206. For example, the mean and standard deviation of each segment is estimated and further splitting of segments is performed to track and classify objects. This processing results in an accurate object count. In one embodiment, each lidar sensor has two laser beams running in parallel. Translation or linear shift in the segments across the depth maps from two beams is used to estimate the direction of travel for each object.

The object motion analysis module 142 supplies an object list 208. In one embodiment, the object list 208 includes a metadata block 210 with a time stamp and object identifier. An object classification block 212 may characterize an object as a human, a vehicle an animal or other moving object. In one embodiment, the object analysis module 142 uses trained machine learning models to characterize the nature of the moving object. A human, an animal and a vehicle have distinctive motion signatures that may be analyzed by the trained machine learning models.

A direction block 214 specifies the direction of the object. The following is an example of object list information:

```
{
    "objectClass": "HUMAN",
    "position": -0.175,
    "direction": "FORWARD",
    "speed": 0.901,
    "id": "8"
}
```

The object motion analysis module 142 has a parallel processing path that includes removing background by filtering out static objects 220. That is, sensor point data from objects that are not moving for a configurable period of time are filtered out.

Point clustering is performed and components are connected to create bounding boxes 222. More particularly, horizontally and vertically adjacent points are clustered together to create connected components that are put in bounding boxes for detection.

Next, object trajectory is predicted 224. This may be done by applying the point cloud data to a state estimation mechanism, such as a Kalman filter.

Objects are then classified based on bounding boxes, object shape and velocity 226. Dimensions are also updated during this process based on the portion of the object that is visible to the lidar sensor.

Data from each Lidar is then synchronized 228. That is, point cloud clusters from the trackable objects from each sensor are translated and rotated using the predictions from the Kalman filter and are then combined to create a fused point cloud. This is necessary because there can be a small-time difference between point clouds from different sensors. Classification and tracking are reapplied on the combined point cloud from all sensors to render a list of final trackable objects.

An object list is then supplied 230. The object list may include objects from processing blocks 202-206, such as metadata block 210 and object classification block 212. The object list may also include a velocity block 234, a position block 236, a size block 238 and a zone information block 242. The following is another example of object list information:

```
{
    "header": {
        "timestamp": 1601336492659,
        "frameId": "quanergy_advanced",
        "sequence": 931570
    },
    "object": [
        "id": "10.1.22.46-7456229",
        {
            "objectClass": "HUMAN",
            "timestamp": "1601336492617",
            "zones": [2,5],
            "position": {
                "y": -0.15526095,
                "x": 3.33369136,
                "z": -0.241805375,
                "lat": 37.767027177199104,
                "long": -122.38932592166782
            },
            "velocity": {
                "y": 0.113413706,
                "x": 0.134449139,
                "z": 0.00430123135,
                "track": 215.14908977593518,
                "speed": 0.1759481181417465
            },
            "size": {
                "y": 0.61535567,
                "x": 0.492491245,
                "z": 0.253136158
            }
        }
    ]
}
```

Figure 3:
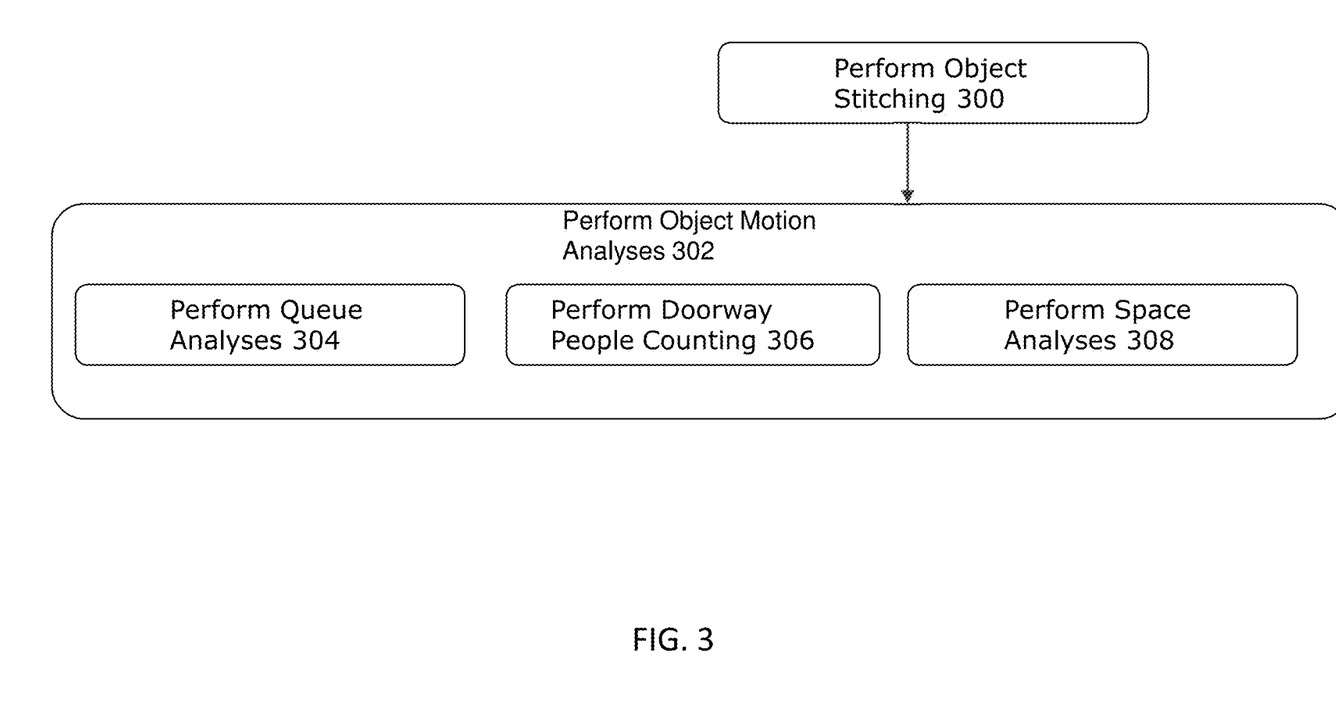
FIG. 3 illustrates object motion analyses performed in accordance with an embodiment of the invention.

The object list is then applied to blocks 300 and/or 302 of FIG. 3. Object stitching is performed at block 300, which is discussed in connection with FIG. 4. The object list is also subject to object motion analyses 302, which may include queue analyses 304, as discussed in connection with FIG. 5. People counting may be performed 306 along with space analyses 308. Space analyses produce space analytics, such as object speed and wait times. These operations may be performed in connection with any number of surveilled geo-locations, including schools, parks, parking lots, commercial real estate, retail space and airports.

Figure 4:
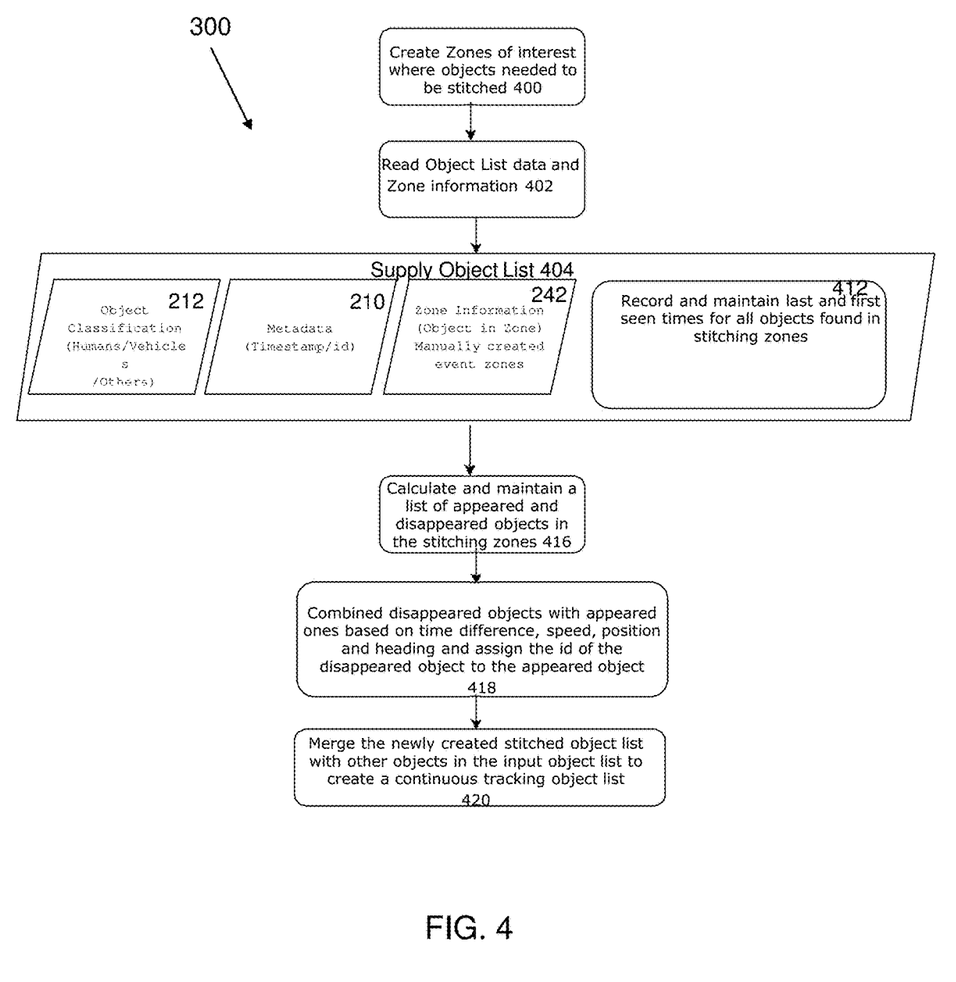
FIG. 4 illustrates object stitching performed in accordance with an embodiment of the invention.

FIG. 4 illustrates processing associated with object stitching 300. Object stitching equates a newly identified moving object with a previously identified moving object that subsequently disappeared.

Zones of interest where objects need to be stitched are created 400. Object list data for the zone of interest is continuously processed 402. This results in the supply of an object list 404. The object list may include object information obtained in connection with the processing of FIG. 2, such as object blocks 212, 210 and 242. The object list also includes a record of the first seen times for all objects in the stitching zones 412. In one embodiment, the following information is maintained:

time first seen
    time last seen
    time seen first in stitching zone(s)
    time seen last in stitching zone(s)
    first position
    last position
    first heading
    last heading
    first speed
    last speed A list of appeared and disappeared objects in the stitching zones is calculated and maintained 416. In one embodiment, the following information is maintained:

Entered if first time seen anywhere<first time seen in stitching zone(s)
    Exited if last time seen anywhere>last time seen in stitching zone(s)
    Disappeared if last time seen anywhere<=last time seen in stitching zone(s)
    Appeared if first time seen anywhere>=first time seen in stitching zone(s)

A machine learning model of people flow in the stitching zones is also updated based upon this information.

Disappeared objects are combined with appeared objects based upon motion criteria. An identification is then assigned from the disappeared object to the appeared object 418. The motion criteria may include:

time of appearance and disappearance
    closest appearing position to the disappearing position
    speed of the two objects
    closest appearing position to the project position of the disappearing object based on heading, speed and time closest appearing position to the project position of the disappearing object based on a machine learning model of the people flow in the zone.

The newly created stitched object list is then merged with other objects in the input object list to create a continuous tracking object list 420.

Figure 5:
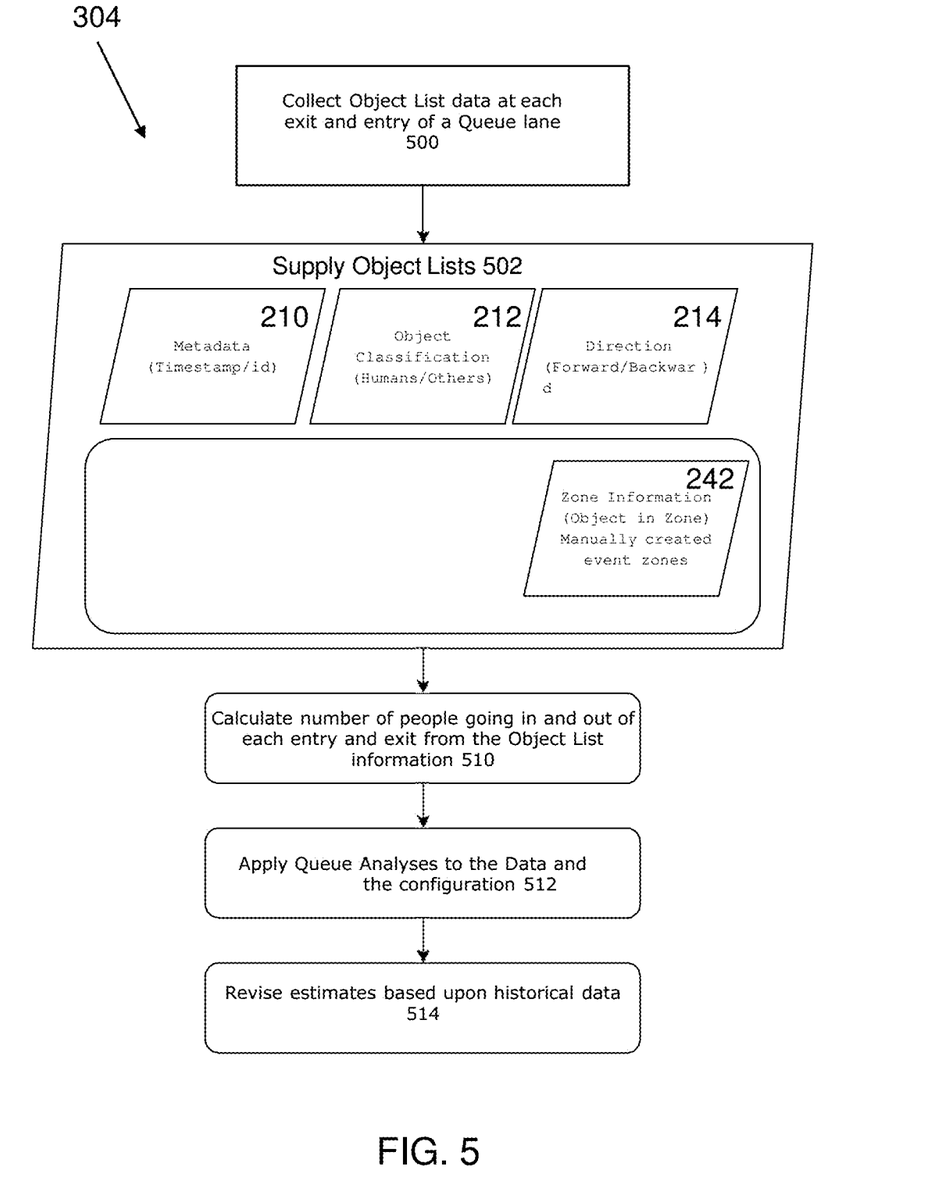
FIG. 5 illustrates queue analyses performed in accordance with an embodiment of the invention.

FIG. 5 illustrates queue analyses 304 performed in accordance with an embodiment of the invention. Object list data is collected at each exit and entry of a queue lane 500. The processing of FIG. 2 may be used to implement this step. An object list is supplied 502, including, for example, objects 210, 212, 214 and 242. If operations 220-228 are used, two zones are created at each entry or exit to calculate direction of walking based on which zone the object was first seen.

The number of objects going in and out of each entry and exit is calculated from the object list information 510. Queue analyses based upon queue theory are applied to the data 512. That is, queue theory processing is applied to the number of objects in and out of the queue and the rate at which they are arriving and leaving.

Figure 6:
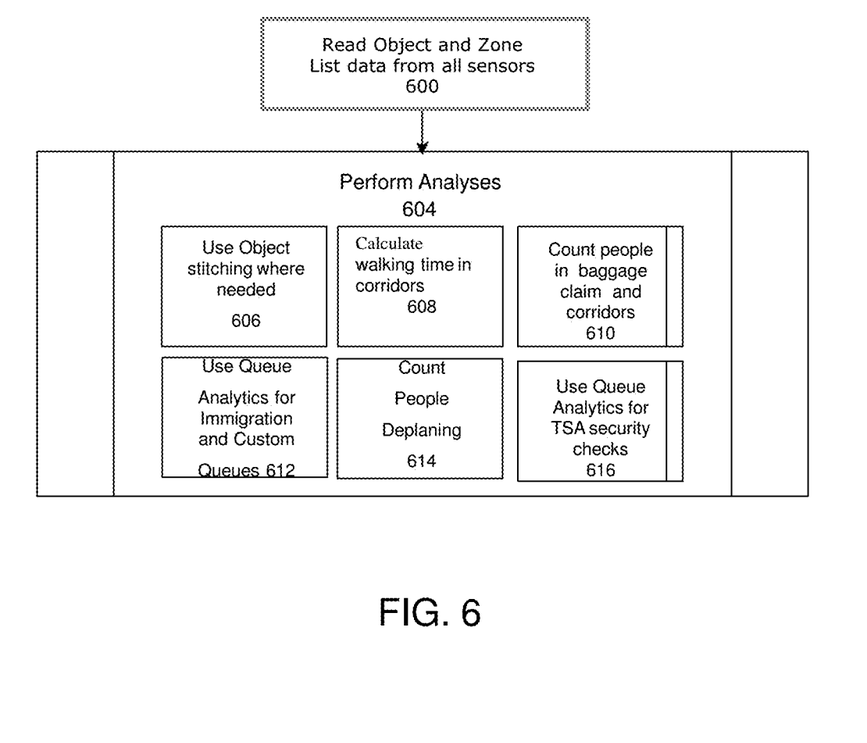
FIG. 6 illustrates the techniques of the invention utilized in connection with airport surveillance.

Estimates are revised based upon historical data 514. For example, an average of the past number of events may be used to calculate current wait times and arrival rates. This number is configurable and in the case of queues with multiple lanes, an average of all inward and outward lanes is used. The queue analyses produce queue analytics, which may include the following information:
  arrival rate
  queue length
  service rate
  predictive wait time FIG. 6 illustrates processing operations associated with surveillance of an airport. Object and zone list data is read from all sensors 600. In a typical airport installation, lidar sensors will be installed in corridors, baggage claim area, immigration and customs area, doorways for deplaning and security areas. The lidar sensor data is analyzed 604. In one embodiment, the analyses includes user object stitching 606. This operation corresponds to the processing in FIG. 4. Walking times in corridors is calculated 608. This operation may be implemented with the processing shown in FIG. 2. The people in the baggage claim area and corridors are counted 610. This operation may be implemented with the processing shown in FIG. 2. Queue analyses are used for immigration and custom queues 612. This operation may be implemented with the processing shown in FIG. 5. People deplaning are counted 614. This operation may be implemented with the processing show in FIG. 2. Queue analyses are used at security check points 616. The processing of FIG. 5 may be used to implement this operation. These analyses may derive the following analytics:
  number of people deplaning for each gate for each flight
  number of people
  walking time
  walking speed
  arrival rate
  queue length
  predictive wait time
  service rate
  maximum wait time
  average wait time
  queue length An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
  a collection of lidar sensors to generate lidar point cloud data for a defined geolocation;
  a computer connected to the collection of lidar sensors via a network, the computer including a processor and a memory storing instructions executed by the processor to:
    process the lidar point cloud data to identify moving objects;
    generate a first object classification for each of the moving objects based on statistical measures derived from a segment map and a second object classification for each of the moving objects based on bounding boxes, object shape and object velocity;
    use the first object classifications to produce a first object list for each of the moving objects, the first object list including object classification information and object direction information;
    use the second object classifications and the first object list to produce a second object list for each of said moving objects, the second object list including the object classification information, object motion information, object position data, and object size data;
    produce a third object list for each of the moving objects after synchronizing the lidar point cloud data from each of the lidar sensors;
    introduce additional context and produce a fourth object list including stitched object information; and perform object motion analyses on the fourth object list to generate object motion analytics for the defined geolocation.

2. The system of claim 1, wherein the memory further stores instructions executed by the processor to create an object depth map.

3. The system of claim 1, wherein the memory further stores instructions executed by the processor to generate the segment map.

4. The system of claim 3, wherein the memory further stores instructions executed by the processor to compute the statistical measures.

5. The system of claim 1, wherein the memory further stores instructions executed by the processor to filter out static objects in the lidar point cloud data.

6. The system of claim 1, wherein the memory further stores instructions executed by the processor to perform point clustering.

7. The system of claim 1, wherein the memory further stores instructions executed by the processor to predict a trajectory of each one of said moving objects.

8. The system of claim 7, wherein the instructions to predict the trajectory of each one of said moving objects include instructions to apply the lidar point cloud data to a Kalman filter.

9. The system of claim 1, wherein the memory further stores instructions executed by the processor to synchronize the lidar point cloud data.

10. The system of claim 1, wherein the memory further stores instructions executed by the processor to equate a newly identified moving object with a previously identified moving object that subsequently disappeared.

11. The system of claim 1, wherein the memory further stores instructions executed by the processor to perform queue analyses using said fourth object list to generate queue analytics for the defined geolocation.

12. The system of claim 1, wherein the defined geolocation is an airport.

13. The system of claim 1, wherein the defined geolocation is a school.

14. The system of claim 1, wherein the defined geolocation is a park.

15. The system of claim 1, wherein the defined geolocation is a parking lot.

16. The system of claim 1, wherein the defined geolocation is a commercial real estate common area.

17. The system of claim 1, wherein the defined geolocation is a retail space.

18. The system of claim 1, wherein the moving object is identified as a human.

19. The system of claim 1, wherein the moving object is identified as a vehicle.

20. The system of claim 1, wherein the moving object is identified as an animal.

* * * * *